(No Model.) 2 Sheets—Sheet 2.
T. B. BOOTH.
APPARATUS FOR CARBONATING BEER, ALE, &c.
No. 565,597. Patented Aug. 11, 1896.
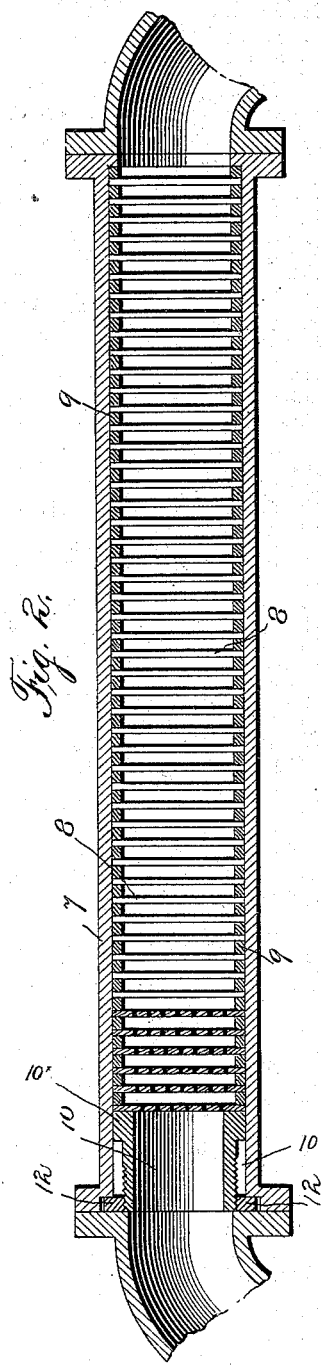
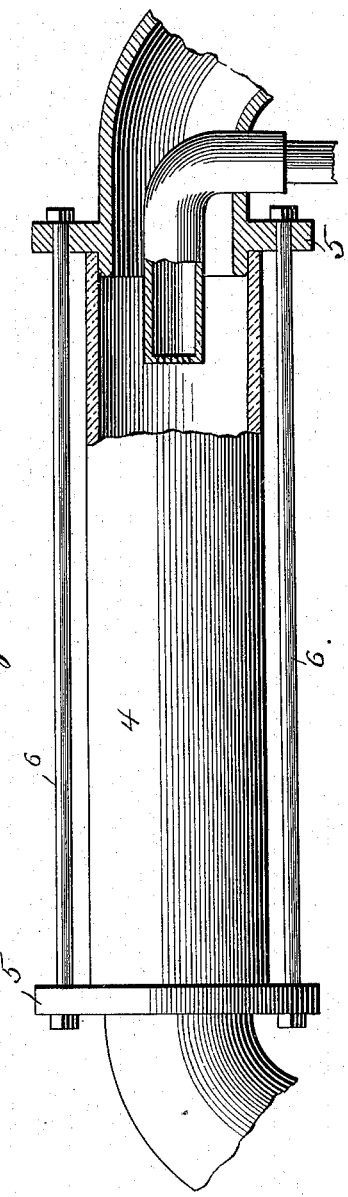

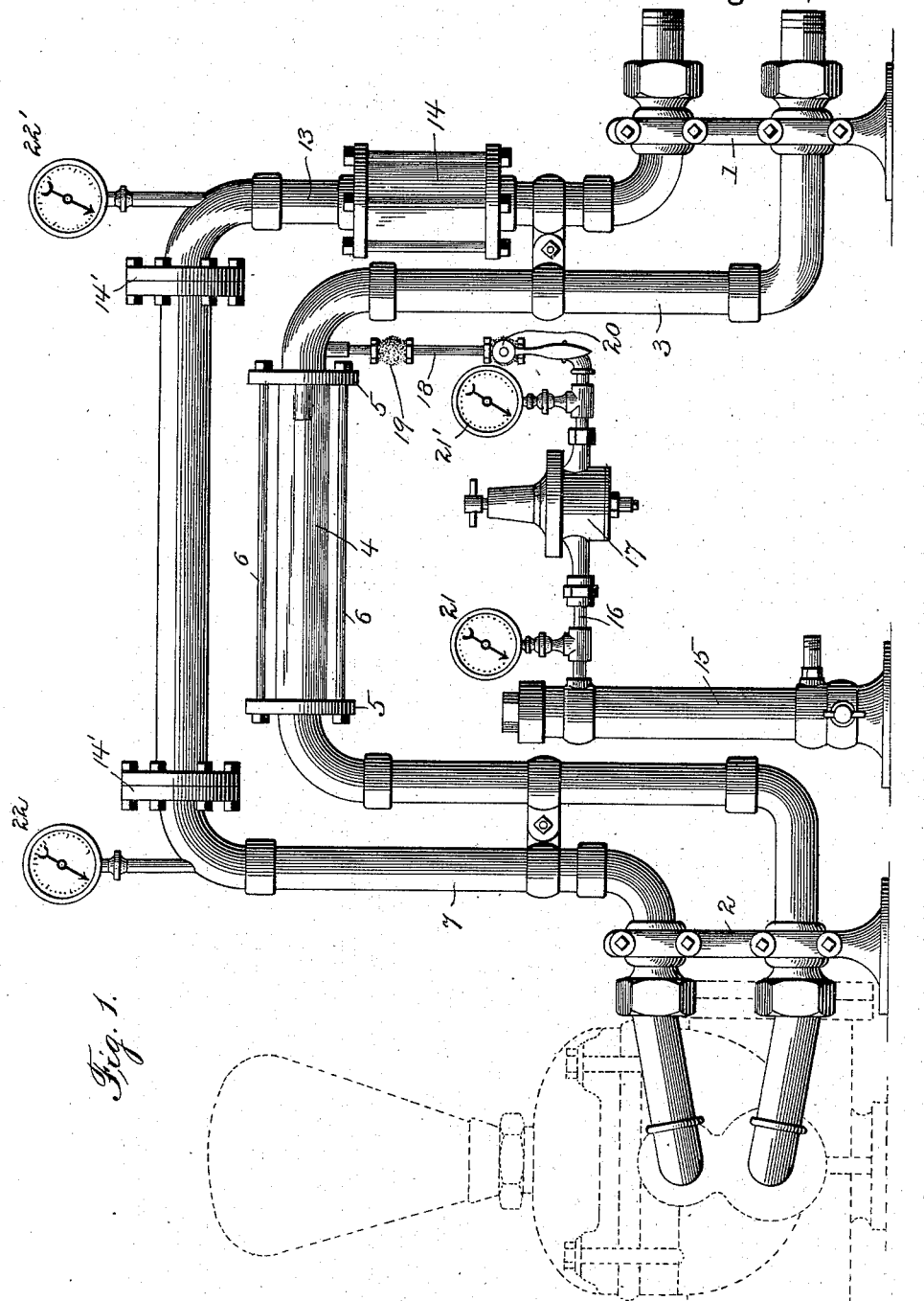

UNITED STATES PATENT OFFICE.

THOMAS B. BOOTH, OF BOSTON, MASSACHUSETTS, ASSIGNOR OF ONE-HALF TO ALEXANDER ROBINSON, OF SAME PLACE.

APPARATUS FOR CARBONATING BEER, ALE, &c.

SPECIFICATION forming part of Letters Patent No. 565,597, dated August 11, 1896.

Application filed November 5, 1895. Serial No. 568,011. (No model.)

*To all whom it may concern:*

Be it known that I, THOMAS B. BOOTH, a citizen of the United States, residing at Boston, in the county of Suffolk and State of Massachusetts, have invented certain new and useful Improvements in Apparatus for Carbonating Beer, Ale, and other Liquids; and I do declare the following to be a full, clear, and exact description of the invention, such as will enable others skilled in the art to which it appertains to make and use the same.

My invention relates to apparatus for carbonating beer, ale, and other liquids, for producing effervescence and preserving the liquid.

The object of the invention is to produce an apparatus by means of which beer, ale, and other liquids can be readily and thoroughly impregnated or saturated with carbonic-acid gas under great pressure, so that complete clearing of the liquid is effected.

The invention consists in the novel construction and combination of parts hereinafter fully described and claimed.

In the accompanying drawings, Figure 1 is an elevation of an apparatus constructed in accordance with my invention. Fig. 2 is a detail sectional view of the carbonating-tube. Fig. 3 is a similar view of the mixing-tube.

In the said drawings the reference-numerals 1 and 2 designate standards or uprights which support the apparatus. Connected with standard 1 is a liquid-pipe 3, having suitable connection at its outer end with a beer, ale, or other liquid tank, and extending upward has connection to a glass tube 4, provided with heads 5, connected together by rods 6. At the opposite end this tube 4 is connected with a downwardly-extending pipe leading to a pump (shown in dotted lines) and forming the inlet for the pump. This pump may be of any ordinary or suitable construction, and forms no part of my invention. Also connected with the pump is a vertical outlet-pipe 7, connected at its upper end with a horizontal tube, which I term the "carbonating-chamber," in which are arranged a number of disks 8, of perforated metal, about one hundred and forty, more or less, being employed in a full-sized machine. These disks are separated from each other by means of annular washers 9, composed of metal rings, forming a number of chambers corresponding with the number of disks. The disks and washers are held in proper relation and position by means of a threaded plug 10, having an annular collar $10^x$, fitting the bore of the tube, and on the stem of the plug is a suitable rubber packing $10^a$, to prevent the escape of gas, and the plug is held and adjusted by means of a threaded nut 12, substantially as shown in the drawings. At the opposite end the tube is connected with an exit-pipe 13, provided with a glass gage 14. This pipe leads to a tank or vessel wherein the discharged liquid is stored for use. The said carbonating-pipe and the pipes 7 and 13 are connected together by means of annular flanges 14', formed on their respective meeting end faces, bolts being used as the fastening means, as shown in Fig. 1 of the drawings.

The numeral 15 designates a carbonic-acid-gas filter connected with any suitable source of supply, either natural or artificial, and filled with a filtering material, such as silk and cotton. At its upper end this filter is connected with a pipe 16, which in turn is connected with a gas-regulator 17, which may be of any ordinary or suitable construction and forms no part of the present invention. Connected with said regulator is an upwardly-extending pipe 18, provided with a stop-cock 20 and a check-valve 19. This pipe passes up into the pipe 3, and has an injector or feeder projecting into the glass tube 4. The injector has its end formed with a series of small holes, through which the gas escapes in the form of spray, as it were.

The numerals 21 and $21^a$ designate high and low gas pressure gages, and 22 and $22^a$ high and low pressure liquid-gages.

The operation is as follows: The liquid is forced into the glass tube by any suitable means and the carbonic-acid gas is also fed to said tube through the filter and regulator and is carried to the pump with the liquid by suction from the latter. The pressure of the gas at the regulator will vary from one to fifty pounds, according to the nature of the liquid to be carbonated. From the pump the liquid and gas are forced to the carbonating-chamber at a pressure varying from two hundred to three hundred and fifty pounds, and passes successively through the perforated disks and the chambers therebetween, which will cause the liquid to be thoroughly impregnated or saturated with the gas, in which condition it is discharged into a suitable receptacle, ready to be drawn therefrom in such charged condition. The liquid and gas will issue at the outlet end of the carbonating-chamber under a pressure of from fifteen to twenty-five pounds, the resulting pressure depending upon the size of the perforations in the disk and the number of disks used, and will be conveyed by the pipe connected therewith to the storage tank or vessel.

By my invention less gas will be necessary to properly carbonate the liquid, as owing to the thorough impregnation or saturation none of the gas will escape from the beer or ale.

Having thus described my invention, what I claim, and desire to secure by Letters Patent, is—

An apparatus for charging liquids with gases, comprising a suction-pipe, a charging-chamber interposed in said pipe, a gas-charging pipe opening in the charging-chamber, a pump, a discharge-pipe leading from the pump, a mixing-chamber interposed in the discharge-pipe, comprising a tube, a plurality of perforated disks therein, annular washers separating the disks, and an adjustable threaded plug to clamp the disks and washers in position.

In testimony whereof I affix my signature in presence of two witnesses.

THOMAS B. BOOTH.

Witnesses:
WM. Y. PEPPERELL,
P. M. ROBINSON.